US010343719B2

(12) United States Patent
Von Hasselbach et al.

(10) Patent No.: US 10,343,719 B2
(45) Date of Patent: Jul. 9, 2019

(54) BODY ARRANGEMENT FOR A FRONT-END STRUCTURE OF A MOTOR VEHICLE, SAID BODY ARRANGEMENT BEING DESIGNED FOR A FRONTAL COLLISION WITH A SMALL OVERLAP

(71) Applicant: Bayerische Motoren Werke Aktiengesellschaft, Munich (DE)

(72) Inventors: Johannes Von Hasselbach, Munich (DE); Florian Woelfle, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/467,393

(22) Filed: Mar. 23, 2017

(65) Prior Publication Data

US 2017/0190362 A1 Jul. 6, 2017

Related U.S. Application Data

(63) Continuation of application No. PCT/EP2015/070165, filed on Sep. 3, 2015.

(30) Foreign Application Priority Data

Sep. 25, 2014 (DE) ......................... 10 2014 219 433

(51) Int. Cl.
*B62D 21/15* (2006.01)
*B62D 25/08* (2006.01)
(Continued)

(52) U.S. Cl.
CPC ............ *B62D 21/152* (2013.01); *B60R 19/34* (2013.01); *B62D 21/02* (2013.01); *B62D 25/082* (2013.01); *B62D 25/085* (2013.01); *B62D 25/088* (2013.01)

(58) Field of Classification Search
CPC .... B62D 21/152; B62D 25/04; B62D 21/155; B62D 25/025; B62D 27/023;
(Continued)

(56) References Cited

U.S. PATENT DOCUMENTS 4,836,321 A * 6/1989 Baumann ................ B60R 19/00
                                                            180/232
6,286,667 B1   9/2001 Braemig et al.
(Continued)

FOREIGN PATENT DOCUMENTS

DE         377258       6/1923
DE    37 10 808 A1     10/1988
(Continued)

OTHER PUBLICATIONS

International Search Report (PCT/ISA/210) issued in PCT Application No. PCT/EP2015/070165 dated Nov. 11, 2015 with English translation (eight pages).
(Continued)

*Primary Examiner* — D Glenn Dayoan
*Assistant Examiner* — Sunsurraye Westbrook
(74) *Attorney, Agent, or Firm* — Crowell & Moring LLP

(57) ABSTRACT

A body arrangement for a front-end structure of a motor vehicle has a lower main longitudinal member arrangement, on the front end of which there is arranged a shock-absorbing transverse member, an upper member arrangement, which runs above a wheel suspension, and a tension strap which is fastened at a first fastening point to a front region of the main longitudinal member arrangement and at a second fastening point to the upper member arrangement. The first fastening point and the second fastening point are spaced apart in a vehicle transverse direction. The tension strap is arranged such that, in the event of a frontal collision of the motor vehicle with a small overlap, in the case of
(Continued)

which a collision partner strikes the upper member arrangement of the motor vehicle laterally with respect to the longitudinal member arrangement, the tension strap, under tension, supports the upper member arrangement on the main longitudinal member arrangement.

12 Claims, 2 Drawing Sheets

(51) Int. Cl.
 *B60R 19/34* (2006.01)
 *B62D 21/02* (2006.01)
(58) Field of Classification Search
 CPC .... B62D 25/082; B62D 25/08; B62D 25/088; B60R 19/34; B60R 19/24; B60R 19/04; B60R 2019/247; B60R 19/00; B60R 19/16; B60R 19/18; B60R 19/26
 USPC .............. 296/187.1, 187.09, 193.06, 203.02, 296/193.09, 187.03, 198, 187.06, 192, 296/193.02, 203.01, 209, 29; 293/133, 293/132, 155, 102, 149, 153, 154; 280/784, 728.1, 770
 See application file for complete search history.

(56) References Cited

U.S. PATENT DOCUMENTS

| | | | |
|---|---|---|---|
| 7,523,979 B2* | 4/2009 | Jeong | B62D 21/152 180/271 |
| 8,672,383 B2* | 3/2014 | Crane | B62D 27/00 296/146.11 |
| 9,126,550 B2* | 9/2015 | Nusier | B62D 21/152 |
| 9,156,418 B2* | 10/2015 | Ramoutar | B60R 19/24 |
| 2005/0275182 A1 | 12/2005 | Kurth | |
| 2008/0023954 A1 | 1/2008 | Eichberger et al. | |
| 2013/0328334 A1 | 12/2013 | Hoiss et al. | |
| 2014/0008923 A1 | 1/2014 | Han et al. | |
| 2015/0021936 A1 | 1/2015 | Nusier et al. | |
| 2015/0061306 A1 | 3/2015 | Barbat et al. | |

FOREIGN PATENT DOCUMENTS

| | | |
|---|---|---|
| DE | 196 11 934 C1 | 4/1997 |
| DE | 198 36 851 C1 | 3/2000 |
| DE | 199 52 536 A1 | 5/2001 |
| DE | 10 2004 028 161 A1 | 12/2005 |
| DE | 10 2011 004 105 A1 | 8/2012 |
| DE | 10 2012 005 843 A1 | 9/2013 |
| DE | 20 2014 103 165 U1 | 7/2014 |
| DE | 20 2014 104 027 U1 | 9/2014 |
| WO | WO 2005/110815 A1 | 11/2005 |
| WO | WO 2013/159880 A1 | 10/2013 |

OTHER PUBLICATIONS

German-language Written Opinion (PCT/ISA/237) issued in PCT Application No. PCT/EP2015/070165 dated Nov. 11, 2015 (six pages).
German Search Report issued in counterpart German Application No. 10 2014 219 433.4 dated Jun. 11, 2015 with partial English translation (12 pages).

* cited by examiner

BODY ARRANGEMENT FOR A FRONT-END STRUCTURE OF A MOTOR VEHICLE, SAID BODY ARRANGEMENT BEING DESIGNED FOR A FRONTAL COLLISION WITH A SMALL OVERLAP

CROSS REFERENCE TO RELATED APPLICATIONS

This application is a continuation of PCT International Application No. PCT/EP2015/070165, filed Sep. 3, 2015, which claims priority under 35 U.S.C. § 119 from German Patent Application No. 10 2014 219 433.4, filed Sep. 25, 2014, the entire disclosures of which are herein expressly incorporated by reference.

BACKGROUND AND SUMMARY OF THE INVENTION

The present invention relates to a body arrangement for a front-end structure of a motor vehicle, said body arrangement being designed for a frontal collision of the motor vehicle with a small overlap.

In the case of a frontal collision of a motor vehicle with a collision opponent, in which the motor vehicle only partially or slightly overlaps with the collision opponent, there are particular requirements demanded of a body in a front-end region of the motor vehicle. A known motor vehicle has, in particular, a left longitudinal member and a right longitudinal member which, in the case of a motor vehicle with a front engine, can also be called engine supports. At the front ends of the engine supports, a bumper cross-member is arranged. In the event of the frontal collision with a small overlap, the collision opponent strikes against a protruding end of the bumper cross-member, in particular outside one of the two longitudinal members. Without additional measures, in such a frontal collision with a small overlap, the affected longitudinal member can only make a relatively small contribution to dissipating collision energy by means of deformation, and the collision opponent can penetrate relatively far in the direction of the passenger cell.

To this end, there are structural proposals for introducing collision energy into the longitudinal member through additional body structural elements. For example, DE 102011004105A1 proposes a cantilevered support which is fixed in a torque-proof manner on the longitudinal member and projects into an intermediate space between a wheel receptacle (house) and an end portion of a bumper cross-member. If, in the event of a frontal collision with a small overlap, the collision opponent then strikes against the cantilevered support over the course of the collision, collision energy can thereby be introduced into the longitudinal member and the latter can contribute to dissipating collision energy. A further concept is shown in US 20140008923 A1, wherein two "crashboxes" are arranged at the front end of the longitudinal member. A first crashbox is arranged aligned with a longitudinal axis of the longitudinal member while the second crashbox extends in a manner directed obliquely outward and forward in order to support an end portion of the bumper cross-member. The two crashboxes are therefore arranged in a substantially V-shaped manner and are both supported on the longitudinal member. By this means, even in the event of a frontal collision with a small overlap, the second crashbox can absorb collision energy and introduce the same into the longitudinal member.

It is the object of the present invention to provide a body arrangement for a front-end structure of a motor vehicle, in which, in the event of a frontal collision of the motor vehicle with a small overlap, energy can be sufficiently introduced using simple measures with little need for construction space and a low weight into the longitudinal member arrangement in order to sufficiently dissipate the collision energy.

This and other objects are achieved by a body arrangement for a front-end structure of a motor vehicle in accordance with embodiments of the invention.

The body arrangement for a front-end structure of a motor vehicle according to the present invention has a lower main longitudinal member arrangement, at the front end of which a bumper cross-member is arranged, an upper support arrangement which extends above a wheel suspension, and a tension strap which is fastened at a first fastening point to a front region of the main longitudinal member arrangement and at a second fastening point to the upper support arrangement. The first fastening point and the second fastening point are spaced apart in the transverse direction of the vehicle, i.e. in a y-direction according to a vehicle coordinate system. The tension strap is arranged in such a manner that, in the event of a frontal collision of the motor vehicle with a small overlap, in which a collision opponent strikes against the upper support arrangement of the motor vehicle laterally with respect to or outside the longitudinal member arrangement, the tension strap supports the upper support arrangement on the main longitudinal member arrangement under tension.

According to the invention, by a very simple structural measure of the suitable provision of the tension strap, which has a low weight and also takes up only little construction space, an introduction of collision energy into the main longitudinal member arrangement is ensured or the main longitudinal member arrangement is used for advantageously supporting the upper support arrangement. Furthermore, by the tension strap being supported on the main longitudinal member arrangement, the main longitudinal member arrangement can be deformed and can thereby dissipate collision energy. By means of the tension strap according to the invention, it is not necessary to provide an additional support or a plurality of additional supports, as is proposed in the prior art.

According to a preferred development of the body arrangement of the present invention, the first fastening point is arranged in front of the second fastening point in the longitudinal direction of the vehicle.

It is thereby ensured that the tension strap is loaded in tension immediately when the collision opponent strikes against the upper support arrangement, and a supporting effect of the main longitudinal member arrangement is used at an early point of the frontal collision.

According to a further preferred development of the body arrangement of the present invention, the first fastening point is arranged below the second fastening point in the vertical direction of the vehicle.

The upper support arrangement is advantageously a wheel house support structure. A wheel house support structure customarily extends in a longitudinal direction of the vehicle and supports the wheel house. Additionally or alternatively, the upper support arrangement can be a suspension strut dome. A suspension strut dome serves for receiving a spring damper unit for a wheel. Furthermore, the upper support arrangement can be a frontmost body pillar, i.e. an "A pillar".

The wheel house supporting structure, the suspension strut dome and optionally also the frontmost body pillar are customarily suitably connected to and combined with one another.

According to a preferred development of the body arrangement of the present invention, the first fastening point and the second fastening point are arranged in front of a front axle. By this means, the tension strap can already be loaded in tension at an early point of the frontal collision with a small overlap and can deploy its effect.

Advantageously, the tension strap when fitted between the first fastening point and the second fastening point has a greater length than the shortest distance between the first fastening point and the second fastening point.

By means of the greater length of the tension strap, when the collision opponent strikes thereagainst, the tension strap can first of all be placed around the collision opponent without being loaded in tension, and optionally only deploys its effect when the collision opponent has struck against the upper support arrangement. Accordingly, the length of the tension strap can be designed in such a manner that, taking into consideration the possible outer shape of a collision opponent, the tension strap is only loaded in tension when the collision opponent strikes against the upper support arrangement.

The tension strap is preferably of flexible design, i.e. with a small inherent rigidity or dimensional stability, and in particular can substantially only be loaded in tension.

This makes it possible for the tension strap, when the collision opponent strikes thereagainst, to be placed onto the collision opponent or around an outer shape of the collision opponent and also makes it possible for the tension strap to be advantageously accommodated in the front-end structure when the tension strap is not in use. Furthermore, such a tension strap, which is substantially only loaded in tension, has the advantage that, in the event of a frontal collision with a large overlap, i.e. in the event of a frontal collision in which a collision opponent strikes completely against the longitudinal member arrangement and does not strike against the motor vehicle laterally with respect to or outside the longitudinal member arrangement, the tension strap does not have any interaction with the upper support arrangement since, because of its flexibility, it cannot be supported on the upper support arrangement.

The tension strap can be designed for example in the manner of a cable or a textile fabric.

The tension strap can be formed here, for example, with metallic threads or with glass fibers, carbon fibers or other suitable fibers which can absorb high tensile forces.

The tension strap can be formed from a metallic material.

Furthermore, the tension strap can be formed from a fiber composite material. All known and suitable fiber composite materials can be used for this purpose.

A "crashbox" can be arranged at a front end of the main longitudinal member arrangement. The crashbox, for example, is exchangeable and is able to absorb collision energy in the event of collisions with a correspondingly large overlap and at a low speed of the motor vehicle without the main longitudinal member arrangement being irreversibly damaged.

Above-explained developments of the invention can be combined with one another as desired to the extent that this is expedient and possible.

Other objects, advantages and novel features of the present invention will become apparent from the following detailed description of one or more preferred embodiments when considered in conjunction with the accompanying drawings.

DETAILED DESCRIPTION OF THE DRAWINGS

A detailed description of an exemplary embodiment of the present invention is undertaken below with reference to the figures.

Figure 1:
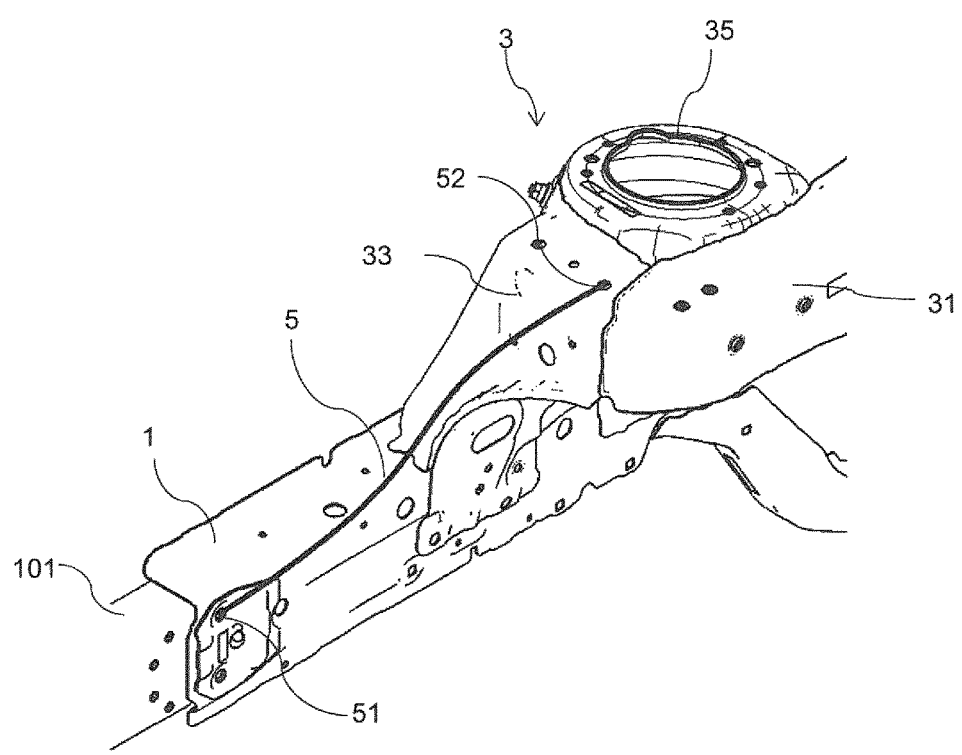
FIG. 1 is a schematic perspective view of a body arrangement of a front-end structure according to an exemplary embodiment of the present invention.

FIG. 1 shows a portion of a body arrangement of a front-end structure of a motor vehicle, in particular a passenger vehicle, according to the exemplary embodiment of the present invention, wherein only a left portion of the body arrangement is shown. A right portion (not shown) of the body arrangement of the front-end structure of the motor vehicle is basically constructed analogously and symmetrically to the left portion.

In particular, FIG. 1 shows a left longitudinal member 1 which, in the case of a motor vehicle with a front engine, can be an "engine support" and forms a lower main longitudinal member arrangement according to the present invention. FIG. 1 also shows an upper support arrangement 3 consisting of a wheel house supporting structure 31, a suspension strut supporting structure 33 and a suspension strut dome 35, wherein the suspension strut dome supporting structure 33 is fixed to the longitudinal member 1, and the wheel house supporting structure 31 can be connected to an A pillar (not shown) or to an end wall (not shown) of the motor vehicle. A front end of the upper support arrangement 3 is arranged offset to the rear with respect to a front end of the longitudinal member 1. The upper support arrangement 3 accordingly begins further at the rear than the longitudinal member 1.

A "crashbox" 101 is arranged at a front end of the longitudinal member 1, wherein a bumper cross-member (not shown) is in turn fastened to the crashbox 101. The crashbox 101 serves for absorbing collision energy in the event of collisions at low speeds and is intended to prevent the longitudinal member 1 from being irreversibly damaged at these low speeds.

Furthermore, the body arrangement has a tension strap 5 which is fastened at a fastening point 51 to a front end of the longitudinal member 1. Furthermore, a rear end of the tension strap 5 is fastened at a fastening point 52 to the upper support arrangement 3.

Figure 2:
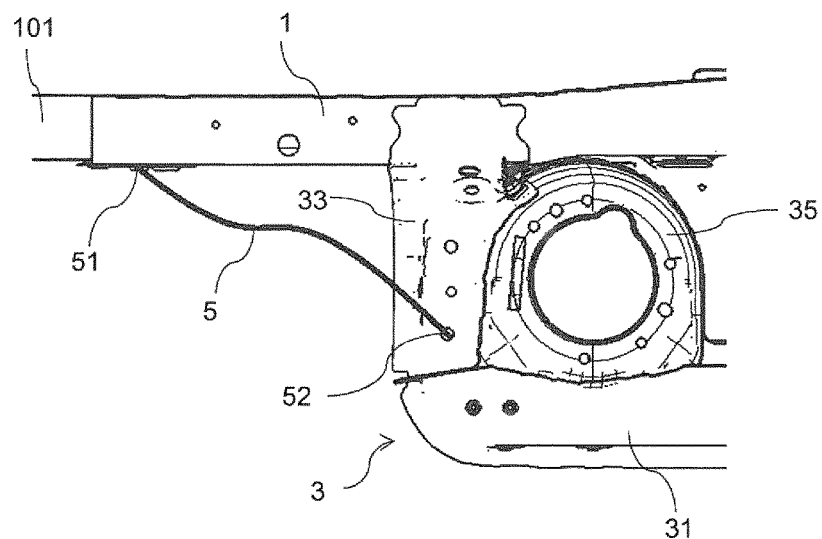
FIG. 2 is a schematic top view of the body arrangement of the exemplary embodiment of the present invention.
Figure 3:
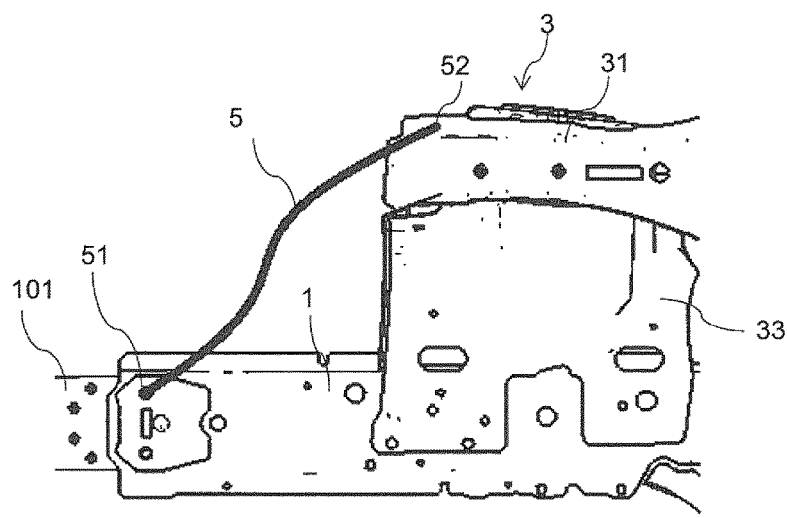
FIG. 3 is a schematic side view of the body arrangement according to the exemplary embodiment of the present invention.

As can be seen in particular in the top view of FIG. 2, the fastening points 51 and 52 are spaced apart from each other in the transverse direction of the vehicle, i.e. in the y-direction of the vehicle. Furthermore, the fastening points 51 and 52 are also spaced apart from each other in the longitudinal direction of the vehicle, i.e. in the x-direction, as can be seen in FIG. 3. The fastening points 51 and 52 are also spaced apart from each other in the vertical direction of the vehicle, i.e. in a z-direction of the vehicle. In other words, the tension strap 5 extends from the fastening point 51 at the front end of the longitudinal member obliquely rearward, outward and upward as far as the fastening point 52 on the upper support arrangement 3.

The tension strap 5 can be formed from a suitable material which can adequately absorb tensile forces and, at the same time, has a certain flexibility, i.e. a low inherent rigidity. For example, the tension strap 5 can be a cable or strap formed from carbon fibers or other suitable fibers. It is also contemplated for the tension strap 5 to be formed from metallic fibers.

The tension strap 5 is longer in its length than a shortest distance between the fastening point 51 and the fastening point 52. The length is selected here in such a manner that, when an average collision opponent strikes against the motor vehicle with a small overlap, the tension strap is only loaded in tension when the collision opponent strikes against the upper support arrangement 3.

A function and effect of the body arrangement according to the exemplary embodiment of the present invention is described below.

The body arrangement according to the present invention is designed and effective in particular for a load situation in which a collision opponent strikes frontally with a small overlap against the motor vehicle. In particular, in this load situation, the collision opponent strikes against the motor vehicle laterally with respect to or outside the longitudinal member 1, and therefore the longitudinal member 1 can initially make only a small contribution, if any at all, to the dissipation of collision energy by deformation. After an outer end portion of the bumper cross-member (not shown) is deformed in the direction of the longitudinal member 1, the collision opponent strikes against the upper support arrangement 3, which is arranged further at the rear with respect to the longitudinal member, wherein the tension strap 5 because of its above-described length is initially placed around the collision opponent without tensile loading and, only as the penetration of the collision opponent progresses, is loaded in tension and supports the upper support arrangement 3 on the longitudinal member 1 by means of tension.

The tension strap 5 here is a relatively lightweight element which can easily be attached to and accommodated on an existing vehicle body. The element 5 can deploy an advantageous effect by being supported on the longitudinal member 1 in the event of collision with a small overlap. By means of the support of the tension strap 5, the longitudinal member 1 can also be deformed here and can thereby dissipate energy even though the collision opponent has not struck directly against the longitudinal member 1 in the event of collision with a small overlap.

In a load situation with, for example, complete overlap, in which the collision opponent strikes frontally against one or both longitudinal members 1, the tension strap 5 advantageously does not deploy any effect. The collision energy is substantially dissipated or absorbed by deformation of the longitudinal member 1. The tension strap 5 because of its flexibility or lack of dimensional stability cannot substantially influence the deformation of the longitudinal member 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A body arrangement for a front-end structure of a motor vehicle, comprising:
    a lower main longitudinal member arrangement, at a front end of which a bumper cross-member is arranged;
    an upper support arrangement which extends above a wheel suspension; and
    a tension strap which is fastened at a first fastening point to a front region of the main longitudinal member arrangement and at a second fastening point to the upper support arrangement, wherein
    the first fastening point and the second fastening point are spaced apart in a transverse direction of the vehicle,
    the second fastening point is disposed laterally outward of the first fastening point in the transverse direction of the vehicle, and
    the tension strap is arranged such that, in an event of a frontal collision of the motor vehicle with a small overlap in which a collision opponent strikes against the upper support arrangement of the motor vehicle laterally with respect to the longitudinal member arrangement, the tension strap supports the upper support arrangement on the main longitudinal member arrangement under tension.

2. The body arrangement as claimed in claim 1, wherein the first fastening point is arranged in front of the second fastening point in a longitudinal direction of the vehicle.

3. The body arrangement as claimed in claim 2, wherein the upper support arrangement is one or more of a wheel house supporting structure, a suspension strut dome or a frontmost body pillar.

4. The body arrangement as claimed in claim 1, wherein the upper support arrangement is one or more of a wheel house supporting structure, a suspension strut dome or a frontmost body pillar.

5. The body arrangement as claimed in claim 1, wherein the first fastening point and the second fastening point are arranged in front of a front axle of the vehicle.

6. The body arrangement as claimed in claim 2, wherein the first fastening point and the second fastening point are arranged in front of a front axle of the vehicle.

7. The body arrangement as claimed in claim 1, wherein the tension strap, when fitted between the first fastening point and the second fastening point, has a greater length than a shortest distance between the first fastening point and the second fastening point.

8. The body arrangement as claimed in claim 6, wherein the tension strap, when fitted between the first fastening point and the second fastening point, has a greater length than a shortest distance between the first fastening point and the second fastening point.

9. The body arrangement as claimed in claim 1, wherein the tension strap is flexible and is substantially designed to be loaded in tension.

10. The body arrangement as claimed in claim 9, wherein the tension strap is a cable or a textile fabric.

11. The body arrangement as claimed in claim 1, wherein the tension strap is formed from a metallic material.

12. The body arrangement as claimed in claim 1, wherein the tension strap is formed from a fiber composite material.

* * * * *